United States Patent [19]

Gibel

[11] 3,718,208
[45] Feb. 27, 1973

[54] EXPANSION CHAMBERED, PRESSURE RELIEF MUFFLER

[76] Inventor: Stephen J. Gibel, 5846 Edgerton Road, North Royalton, Ohio 44133

[22] Filed: July 15, 1971

[21] Appl. No.: 162,785

[52] U.S. Cl. ................ 181/50, 181/56, 181/57, 181/60, 181/45
[51] Int. Cl. ........... F01n 1/10, F01n 7/16, F01n 7/18
[58] Field of Search ...... 181/36 A, 45, 37, 42, 50, 55, 181/47, 57, 48, 59, 56, 60, 69, 61–63

[56] References Cited

UNITED STATES PATENTS

| 2,748,883 | 6/1956 | Ralph | 181/61 |
| 2,600,236 | 6/1952 | Gibel | 181/36 A |
| 2,815,088 | 12/1957 | Gibel | 181/36 A |
| 3,339,668 | 9/1967 | Trainor | 181/37 |
| 3,380,553 | 4/1968 | Gibel | 181/60 |
| 3,561,561 | 2/1971 | Trainor | 181/37 |
| 3,612,214 | 10/1971 | Blatt et al. | 181/37 |

FOREIGN PATENTS OR APPLICATIONS

| 412,377 | 11/1966 | Switzerland | 181/60 |
| 1,317,700 | 1/1963 | France | 181/36 A |

Primary Examiner—Robert S. Ward, Jr.
Attorney—Ely, Golrick & Flynn

[57] ABSTRACT

Muffler for air-exhausts and the like in which sound is muffled by passage of the air from a relatively unrestricted domed expansion chamber through a disseminator into a silencing chamber and thence diffused through porous side of the silencing chamber. The end of the silencing chamber opposite the disseminator is provided with a pressure relief means.

6 Claims, 3 Drawing Figures

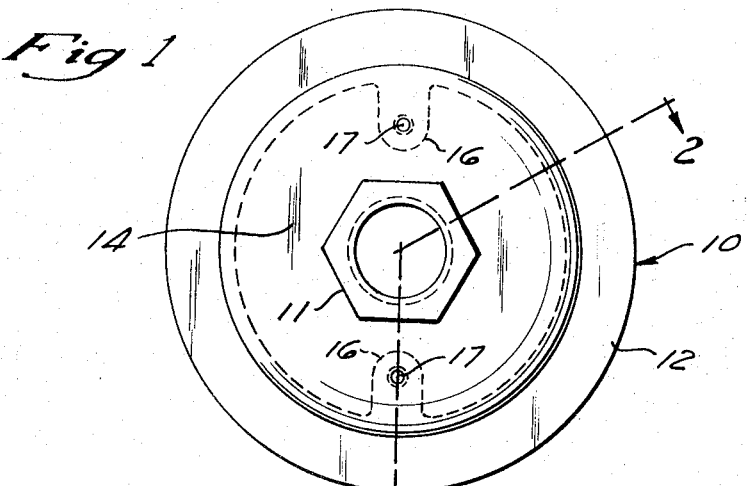
Fig. 1
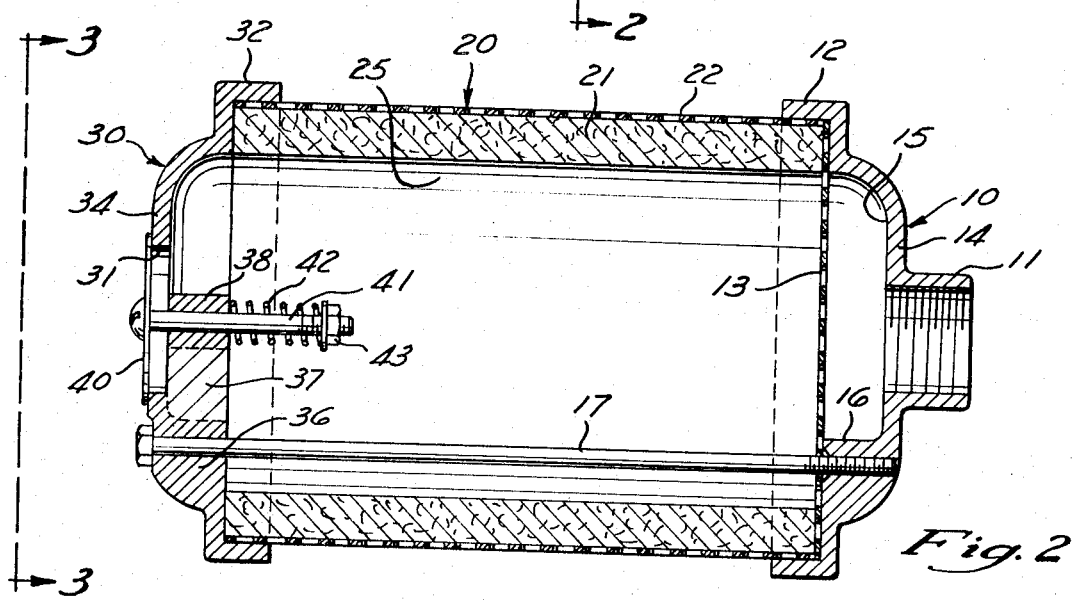
Fig. 2
Fig. 3
INVENTOR.
STEPHEN J. GIBEL
BY
ELY, GOLRICK & FLYNN
ATTORNEYS

EXPANSION CHAMBERED, PRESSURE RELIEF MUFFLER

This invention relates to improvements in mufflers for the exhausts of pneumatically operated tools, cylinders, and like equipment, particularly those in which the back-pressure of the exhaust line must not exceed prescribed minimum pressures. This invention is an improvement upon those of the type shown in my U.S. Pat. No. 3,380,553, issued Aug. 30, 1968.

Mufflers of the above-described type have heretofore been comprised essentially of a head having a plurality of chambers therein for turbulent expansion of the exhaust gases, said chambers being separated by a disseminator plate from a following silencing chamber in which the expanded air is discharged through a cylindrical side wall of fibrous or like porous material retained against the head by a suitable end cover. As initially installed such mufflers are highly efficient silencers dissipating the fluid energy of such air which, if unmuffled would exhaust the air at an intolerable noise level. Unfortunately the exhaust air for many pneumatically operated tools and equipment contains entrained fine mists of liquids and vapors which can clog the interstices of the porous walls of the silencing chamber. This can cause the eventual build-up of back pressures which impairs the efficiency of the operation of the pneumatically operated devices but which is not necessarily noticeable until the speed of operation is appreciably slowed. Even before this stage the entire muffler should have been replaced either by a new muffler or one which has been reconditioned by replacement of the clogged sidewall. Due to the intolerable noise of the unmuffled exhaust, however, any such replacement, whether before or after appreciable slowdown, must usually be postponed until the end of the shift or other production period in which the machine is normally shut down.

It is an object of this invention to provide an improved muffler of the type described which will permit the pneumatic tools and equipment to continue to operate efficiently without an efficiency-impairing slow-down and which provides a suitable warning, other than by slow down, that the muffler or its silencing element should be replaced.

The present invention resides in certain heretofore unobvious constructions and combinations and revisions and rearrangements of parts, providing a more efficient operation and economical construction; its further advantages will be apparent from the following description, claims, and drawings, in which:

FIG. 1 is an end view of the domed head of a muffler made according to this invention.

FIG. 1 is a cross-section taken along the line 2—2 of FIG. 1.

FIG. 3 is an end view taken along the line 3—3 of FIG. 2.

Referring to the drawings, a muffler made according to this invention is comprised of a domed head member or cover 10, a cylindrical body 20 and an end closure member 30. The domed head 10 is provided with a central boss 11 suitably internally pipe-threaded to allow the muffler to be secured on a standard pipe constituting the exhaust pipe of a pneumatic exhaust line or connected thereto by a suitable fitting. The circumference of the cover 10 constitutes an internal flange 12 providing a seat for a disseminator sheet 13 and the body 20.

The seat of the flange 12 is axially spaced from the outer wall 14 of the cover 10 to provide an expansion chamber 15 between the sheet 13 and the wall 14. Except for the internal bosses 16 for tie rods 17 and the fillet connecting the wall 14 to the flange 12, the expansion chamber 15 is a substantially unrestricted cylindrical volume. For effective operation it has been found that the proportion of the axial length to the internal diameter of the chamber may be at least in the order of 1:3.5 and preferably in the order of 1:5. Particularly if the effective limits of the area of the disseminator sheet to the base of the inlet pipe fitting on which the boss 11 is mounted are observed, a proportion of the axial length of the chamber 15 to its internal diameter greater than the order of 1:10 will unduly constrict the desired expansion of exhaust air in the chamber 15.

The disseminator sheet 13 may be either a disk of perforated metal, as shown, or of open-mesh screen of heavy wire. If of perforated metal, the area of the openings with respect to the total area of the sheet measured at the inside diameter of the porous sleeve 21 or the seat of the flange 12 (whichever is smaller) is preferably approximately 50 percent. It may be as low as 30 percent (a lesser percentage materially constricts the flow of air through the sheet) and as high as approximately 70 percent (in order to provide sufficient strength and an adequate pressure drop across the sheet). If wire mesh is used instead of a perforated metal sheet, the same ratios of open area to the effective total area of the disseminator should be observed; this may be obtained, for example, with screen as fine as 14 mesh screen of 0.028 inch wire or coarser screen. The proportions of the total effective area of the sheet 13 to the bore of the fitting received by the boss 11 has also been found critical. A ratio of approximately 13:1 has been found preferable with a lower limit of 10:1 necessary for satisfactory operation and an upper limit of 20:1 dictated by the economy of the size of the muffler for the amount of exhaust air which can be delivered into the domed cover 10 at normal low exhaust line pressures.

The body 20, defining a silencing chamber 25, is comprised of a tubular wall 21 of highly porous material such as loosely felted cellulosic fibers (bonded together to the extent necessary for mechanical strength by suitable resinous binders) providing a tortuous path for the exhaust air through the wall 21. The axial length of the wall is dictated by its porosity, and should not provide a pressure drop materially greater than that across the plate 13; the wall should also be thick enough to reduce the sound level to approximately that of the surrounding atmosphere. To protect the relatively soft and porous wall 21 and provide strength for the axial load imposed by the tie rods 17, an outer covering of perforated metal or screen 22 is provided.

The end closure 30 for the silencing chamber is a domed structure similar to the head 10 and has an internal flange 32 receiving the body 20. The internal bosses 36, corresponding to the bosses 16, however, are provided with extending ribs 37 supporting a central hub 38. The exterior wall 34 of the closure 30 is drilled to provide an opening 31 larger in diameter than the boss 11 of the head 10.

The opening 31 in the closure 30 is normally closed by the valve disk 40 carried by the stem 41 journaled in the hub 38. The internal end of the stem 41 is threaded to allow an adjusting nut to hold a light spring 42 under slight compression.

In initial operation the valve 40 remains normally closed and the exhaust line noise is muffled by unrestricted and relatively non-turbulent expansion in the chamber 15, passage through the plate 13 and dispersal through the body 20. As the porosity of the wall 21 is decreased by entrained oil and the like and the exhaust pressure builds up, usually intermittently, in the silencing chamber 25, such pressure is relieved by the opening of the valve 40 set by the adjustment of the nut 43. Consequently, the valve 40 can be set to open before operating efficiency of the pneumatic equipment is appreciably impaired or a noticeable slow down occurs. When it does open, the noise level is increased, thereby warning that the muffler is due for replacement and/or re-conditioning when the machine is next normally shut down. Surprisingly, even when the valve 40 is fully opened, the exhaust noise is still substantially muffled and the pneumatic equipment may continue to operate efficiently and without severe distracting noise. This is due to the continued dissipation of noise within the opened muffler.

This invention is not limited to the specific embodiment disclosed, but may be varied within the scope of the following claims.

What is claimed is:

1. A muffler for exhaust gas of pneumatic equipment comprising a domed head having an inlet thereto, a porous-walled body defining an elongated silencing chamber, a disseminator sheet interposed between the cavity of said domed head and said silencing chamber, and an end closure for said body, said disseminator sheet having a multiplicity of openings therethrough permitting direct passage of gas from the cavity of said domed head into said silencing chamber, said cavity being a single chamber allowing the substantially unrestricted expansion therein of gas entering said cavity through said inlet.

2. A muffler as defined in claim 1 in which the proportion of the areas of the openings in said disseminator sheet is in the range of 30 to 70 percent of the total area of the sheet.

3. A muffler as defined in claim 2 in which the ratio of the axial length of the said expansion chamber to its diameter ranges between 1:4 and 1:10.

4. A muffler as defined in claim 3 in which the proportion of the area of the disseminator sheet to the cross-sectional area of the inlet to the expansion chamber ranges between 10 to 20.

5. A muffler as defined in claim 1 in which the end closure is provided with an opening greater in area than the inlet to said expansion chamber; valve means to close said opening, biasing means holding said valve means normally closed and means for adjusting said biasing means to allow said valve to open when pressure within said body exceeds a limit set by said adjusting means.

6. A muffler as defined in claim 5 in which said end closure is provided with a central hub and said valve means comprises a valve normally seating on said opening in said closure and a valve stem journaled in said hub, said adjusting means comprises a nut threaded on said stem opposite said valve, and said biasing means comprises a spring lightly compressed between said nut and said hub.

* * * * *